(12) United States Patent
Zydek et al.

(10) Patent No.: US 10,783,780 B2
(45) Date of Patent: Sep. 22, 2020

(54) METHOD FOR HANDLING A CONTROL CARD

(71) Applicant: Continental Teves AG & Co. oHG, Frankfurt am Main (DE)

(72) Inventors: Bastian Zydek, Bad Soden (DE); Thomas Grotendorst, Eschborn (DE); Enno Kelling, Eschborn (DE); Stefan Lüke, Rosbach vor der Höhe (DE); Marc Menzel, Weimar (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/587,297

(22) Filed: Sep. 30, 2019

(65) Prior Publication Data

US 2020/0027345 A1    Jan. 23, 2020

Related U.S. Application Data

(63) Continuation of application No. 15/514,689, filed as application No. PCT/EP2015/073241 on Oct. 8, 2015, now abandoned.

(30) Foreign Application Priority Data

Oct. 10, 2014    (DE) .......................... 10 2014 220 624

(51) Int. Cl.
*G08G 1/16* (2006.01)
*G08G 1/0962* (2006.01)
(Continued)

(52) U.S. Cl.
CPC ......... *G08G 1/09623* (2013.01); *B60W 30/00* (2013.01); *B60W 30/08* (2013.01);
(Continued)

(58) Field of Classification Search
CPC ........ G05D 1/02; G05D 1/021; G05D 1/0287; G05D 1/0212; G08G 1/16; G08G 1/161;
(Continued)

(56) References Cited

U.S. PATENT DOCUMENTS 9,189,961 B2    11/2015    Mehr et al.
9,442,489 B2 *   9/2016    Reichel .................. G08G 1/164
(Continued)

FOREIGN PATENT DOCUMENTS

DE    102010030867 A1    1/2012
DE    102012208256 A1    11/2013
(Continued)

OTHER PUBLICATIONS

Campbell et al., "Autonomous driving in urban environments: approaches, lessons and challenges," Philosophical Transactions of the Royal Society A, (2010) 368, pp. 4649-4672.
(Continued)

*Primary Examiner* — Benyam Haile
(74) *Attorney, Agent, or Firm* — RatnerPrestia

(57) ABSTRACT

A method for handling a control card, wherein the control card is received by another vehicle. This provides an increased degree of safety in situations to be regulated, as it is possible to compare control cards of different vehicles and coordinate them if necessary.

24 Claims, 2 Drawing Sheets

(51) Int. Cl.
  *G08G 1/0967* (2006.01)
  *B60W 30/00* (2006.01)
  *B60W 30/08* (2012.01)

(52) U.S. Cl.
  CPC ..... *G08G 1/09626* (2013.01); *G08G 1/09675* (2013.01); *G08G 1/096716* (2013.01); *G08G 1/096725* (2013.01); *G08G 1/096741* (2013.01); *G08G 1/096775* (2013.01); *G08G 1/096791* (2013.01); *G08G 1/16* (2013.01); *G08G 1/161* (2013.01)

(58) Field of Classification Search
  CPC ........ G08G 1/163; G08G 1/166; G08G 1/162; G08G 1/0104; G08G 1/0112; G08G 1/0061
  See application file for complete search history.

(56) References Cited

U.S. PATENT DOCUMENTS

| | | |
|---|---|---|
| 2009/0224942 A1 | 9/2009 | Goudy et al. |
| 2011/0087433 A1 | 4/2011 | Yester |
| 2011/0227757 A1 | 9/2011 | Chen et al. |
| 2012/0265435 A1 | 10/2012 | Yu et al. |
| 2014/0278029 A1 | 9/2014 | Tonguz et al. |
| 2014/0316865 A1 | 10/2014 | Okamoto |
| 2015/0022378 A1 | 1/2015 | Hahne et al. |
| 2017/0025005 A1 | 1/2017 | Barth et al. |
| 2017/0076597 A1 | 3/2017 | Beattie et al. |
| 2017/0305434 A1 | 10/2017 | Ratnasingam |
| 2017/0356751 A1 | 12/2017 | Iagnemma |
| 2018/0012496 A1 | 1/2018 | Hasberg et al. |
| 2018/0050698 A1 | 2/2018 | Polisson et al. |
| 2018/0134282 A1 | 5/2018 | Freienstein et al. |

FOREIGN PATENT DOCUMENTS

| | | |
|---|---|---|
| DE | 102012021282 A1 | 4/2014 |
| DE | 102014003550 A1 | 9/2014 |
| EP | 1569183 A2 | 8/2005 |
| EP | 2205945 B1 | 5/2013 |

OTHER PUBLICATIONS

German Search Report for German Application No. 10 2014 220 624.3, dated Aug. 4, 2015, including partial English translation, 10 pages.

Final Office Action for U.S. Appl. No. 15/514,290, dated Aug. 29, 2019, 19 pages.

International Preliminary Report on Patentability and Written Opinion for International Application No. PCT/EP2015/073240, dated Apr. 11, 2017, 8 pages.

International Search Report and Written Opinion for International Application No. PCT/EP2015/073241, dated Dec. 22, 2015, 10 pages.

Notice of Allowance for U.S. Appl. No. 15/513,043, dated Dec. 5, 2018, 11 pages.

Notice of Allowance for U.S. Appl. No. 15/514,290, dated Mar. 30, 2020, 11 pages.

* cited by examiner

METHOD FOR HANDLING A CONTROL CARD

CROSS REFERENCE TO RELATED APPLICATIONS

This application is a U.S. Continuation Application of U.S. application Ser. No. 15/514,689, filed Mar. 27, 2017 which is a U.S. National Phase of PCT International Application No. PCT/EP2015/073241, filed Oct. 8, 2015, which claims priority to German Patent Application No. 10 2014 220 624.3, filed Oct. 10, 2014, the contents of such applications being incorporated by reference herein.

FIELD OF THE INVENTION

The invention relates to a method for handling a control card containing traffic regulations in a vehicle.

BACKGROUND OF THE INVENTION

Traffic regulations are currently usually defined by generally applied rules such as give way to the right, traffic signs, light signals or by traffic police. Individually steered vehicles, such as motor vehicles or bicycles, rail vehicles such as trams and also pedestrians, are able to avoid potential collisions and accidents by following these rules. This applies to right-of-way rules for example, but also to other traffic regulations such as no overtaking, for example.

For modern vehicles and other road users, traffic regulations are usually read by the driver or pedestrian from road signs, light signals or traffic police or are determined from the specific traffic conditions. Thus for example, a driver can tell in the absence of road signs at an intersection that the basic rule of giving way to the right applies. He can deduce from other vehicles at the intersection whether he has right-of-way or not, i.e. has to give way if necessary. If the driver sees a member of the traffic police, he can also tell whether he is allowed to drive on or not. When a vehicle is approaching a junction, for example an access road to a motorway or other highway, the driver can determine from the laws of the country whether a merging vehicle should in principle wait for a gap in the flowing traffic, or whether the merging vehicle is given priority.

The manual interpretation of traffic regulations is always associated with the risk of human error. The result of incorrectly interpreting the traffic regulations or deliberately disregarding traffic regulations means that there is a very high risk of an accident. Therefore, systems have already been developed that interpret traffic regulations, for example by means of a camera, and help the driver to observe the traffic regulations. Of course, said systems cannot prevent an accident, particularly if at least one vehicle involved in a situation to be controlled interprets at least one traffic rule incorrectly. This may be a result of technical faults for example or also recognition problems, such as having a road sign covered in snow.

SUMMARY OF THE INVENTION

Therefore, an aspect of the invention aims to provide an alternative, for example improved, method for handling traffic regulations. This is achieved according to the invention by a method according to claim 1. Advantageous configurations can be taken for example from the dependent claims. The content of the claims is incorporated into the content of the description by explicit reference.

An aspect of the invention relates to a method for handling a control card containing traffic regulations in a motor vehicle, which comprises the following step:

receiving a control card directly from another vehicle.

By means of the method according to an aspect of the invention a traffic rule or control card can be received by another vehicle. This makes it possible to synchronise the traffic regulations of a plurality of vehicles. For example, in this way it is possible to prevent two vehicles crossing an intersection having to signal to the other driver respectively, that one of them has the right-of-way, as the vehicles can communicate with one another when using the method according to the invention and can recognise any discrepancies in the recognised traffic regulations that may result in an increased risk of accident. However, this is only one possible area of application of the method according to the invention. Numerous other applications are possible, for example such as those described further below.

The use of a control card is particularly advantageous because such a card is not restricted to including the traffic regulations for one's own vehicle, but can also contain traffic regulations applicable to other road users, in particular vehicles. On a technical level, by means of such a card, the conditions are set for taking into account not only the traffic regulations applicable to oneself but also those that apply to other road users.

For example, the received control card can be used directly in the vehicle or it can also be compared with a control card created in the vehicle itself or obtained from another source. For example, this can be performed as described below.

Traffic regulations can be defined in particular as a right-of-way or give way and no overtaking. Other traffic regulations can also be processed by means of the method according to the invention, for example speed limits or stopping restrictions.

A control card is defined in particular as a set of traffic regulations, which are assigned for example to a situation to be regulated and/or to a road section or area to be regulated. In particular, a control card can contain traffic regulations that correspond with one another, for example right-of-way rules for each road and each driving direction of several roads which cross at an intersection, or right-of-way rules for a motorway and an access lane onto the motorway. Ideally the traffic regulations should correspond with one another so that by observing the traffic regulations a collision between the vehicles involved is avoided. For example, this can mean at an intersection that both directions of a continuous road have right-of-way, whilst both directions of a crossing road have to give way. At a junction this can mean that priority is given to the continuous traffic or the merging traffic. On a road where overtaking is possible this can mean that with two-way traffic a temporary no overtaking rule is established, for example no overtaking a slow-moving vehicle such as a lorry or an agricultural vehicle.

A control card can be used for example to display to the driver the traffic regulations contained therein on the instrument panel or in a head-up display. It can however also be used for example for an autonomous driving system or for an assistance system, for example.

According to one embodiment, it is provided that the method is performed such that an approach to an intersection or junction is recognised, wherein the approach is identified preferably by means of environmental sensors, in particular by means of a camera, by means of satellite navigation, by means of an electronic road map and/or by means of car-to-X-communication.

This makes it possible to carry out the method in a situation that is particularly in need of regulation. This may also be the case in particular, if the approach involves several vehicles and/or this is identified. A junction can also be defined in particular as an access lane onto a motorway. An intersection can also be defined as a roundabout or any other branching or merging of roads.

It is preferable in this case that the traffic regulations contained on the control card are assigned to the intersection or junction, in particular right-of-way and give way.

According to one embodiment, it is provided that the method is performed such that the vehicle sends a message to another vehicle that receives a request to transmit a control card.

This makes it possible, for example, for the vehicle performing the method, when following a slow-moving vehicle, to ask the slow-moving vehicle before performing an overtaking procedure whether it is possible to perform said overtaking procedure. If the slow-moving vehicle does not detect any oncoming traffic a control card can be generated which does not include a no overtaking instruction. If oncoming traffic has been identified a control card can be produced which includes a temporary no overtaking rule. Said control card is then sent from the slow-moving vehicle to the following vehicle and indicates to the latter whether an overtaking procedure is possible or should not be attempted.

The following vehicle can send the request for transmitting a control card, in particular relating to the proposal of collaborating in an overtaking procedure, whereby in said proposal the slow-moving vehicle can communicate to following vehicles that it is able to collaborate with the planning of an overtaking procedure. Such a proposal can be received for example by the vehicle performing the method according to the invention.

By means of such applications the safety on country roads, for example, can be increased considerably, as a slow-moving vehicle such as a lorry typically has a better field of vision and better sensors than following vehicles.

According to one embodiment, the method is repeated continually, in particular it is repeated periodically for continual synchronisation.

In this way, for example, the vehicles involved can continually exchange control cards, in particular by means of vehicles communicating by means of direct or indirect radio connection, which are involved in a situation requiring regulation, in particular in order to identify any problems, for example control cards that do not correspond or match, as early as possible and prevent accidents. The method can also be performed such that a vehicle continually sends its respective control card, regardless of whether it is received by another vehicle or another unit.

According to one embodiment, together with the control card one or more of the following elements are received:
a registration number of a vehicle sending the control card,
an identification number of a vehicle sending the control card,
a topology of the intersection,
object properties, in particular the manner, position and/or trajectory, of a vehicle transmitting the control card,
information about the reliability of the control card and/or about the reliability of environmental sensors, in particular a camera,
information about vehicles, which are not equipped with the technology for participating in the synchronisation of traffic regulations, in particular which are not equipped with car-to-X-communication technology, and in particular including their number plate,
a measure of reliability.

Such information can improve and/or facilitate the evaluation of the control card in the received vehicle. A measure of reliability can relate for example to the quality of sensors of the transmitting vehicle and thus indicate how reliable the control card is, for example whether the road signs or intersection topologies have in fact been correctly identified.

According to one embodiment, it is provided that the method also comprises the following steps:
comparing the received control card with an additional control card, and
triggering a matching procedure, when the control card and the additional control card do not match.

In this way, if the control cards do not match, a matching procedure can be triggered that can lead, for example, to matching control cards which reduce the risk of accident further. Control cards that do not match are defined in particular as control cards, which display for at least one actually present or only for a possibly present vehicle at least two different traffic regulations. For example, two non-matching control cards can be designed such that one control card indicates right-of-way for a specific road at an intersection in a specific direction, whereas the other control card indicates to give way. Matching control cards typically indicate for all possible vehicle locations the same traffic regulations respectively.

When the control cards match, typically no synchronising procedure is triggered. In this case for example a communication can be sent to an external unit such as other vehicles or a central server, the communication indicating that the control cards match. This indicates that the intersection can be passed on the basis of the matching control cards without risk by all of the vehicles involved.

According to one embodiment, it is provided that the additional control card is produced by means of the following steps:
identifying the environmental surroundings by means of a number of environmental sensors,
deriving a number of traffic regulations based on the environmental surroundings, and
producing the control card based at least on the traffic regulations.

This makes it possible to compare the control card received by another vehicle with a control card produced by the vehicle itself.

Environmental surroundings can include for example an intersection, a number of road signs, a number of light signals, a number of further vehicles or other road users, a junction and/or a road. They can also include a specific situation that requires regulation, for example when a slow-moving vehicle identifies oncoming traffic that prevents overtaking by following vehicles.

The environmental sensors can comprise a number of cameras, for example. However, they can also consist of other environmental sensors, for example ultrasound sensors, radar devices, car-to-X-communication means or mobile network communication means. By means of a camera, intersection topologies, road signs, junctions or oncoming vehicles, for example, can be identified.

For example, traffic regulations can be identified from road signs or intersection topologies. From an identified road sign, for example right-of-way, give way or STOP, the corresponding traffic rule can typically be directly derived. From an identified intersection topology without road signs the basic rule can be defined as right-before-left, wherein with reference to other identified vehicles, a traffic rule can be derived for one's own vehicle. A right-of-way rule can be determined from an identified junction or access road, taking into consideration the local laws and regulations. From the identified oncoming vehicles it is possible to derive a no overtaking rule for following vehicles.

The control card is typically produced in that firstly the directly derived rules, for example from an identified right-of-way sign, are written onto the control card and then corresponding compulsory traffic regulations are written onto the control card. For example, a right-of-way of one's own vehicle can correspond with a give way rule for crossing traffic, as otherwise there would be a risk of an accident. The right-of-way of a vehicle driving on the motorway can correspond with a give-way rule for a merging vehicle.

By comparing control cards in particular it is possible to check whether the control card corresponds with other control cards or produces a consistent image together with other control cards. This means in particular that the control cards contain traffic regulations which result in the least possible risk of accident.

In particular it is possible to compare between control cards produced by different vehicles, for example by means of respective environmental sensors.

According to one embodiment, it is provided that the additional control card is received by a central server. This makes it possible to use a global back-end, wherein the central server supports the vehicles with the management and exchange of control cards.

According to one embodiment, the vehicle and other vehicles are involved in the matching procedure that are approaching an intersection or junction or that are driving on the same road. According to a further embodiment, which can also be combined with the latter, only those vehicles are involved in the matching procedure from which an intersection of respective trajectories has been calculated.

This corresponds to typical groups of vehicles, between which it is advantageous to compare traffic regulations or control cards containing said traffic regulations.

According to one embodiment, the matching procedure is performed by the repeated direct exchange and comparison of control cards and/or plausibility information between the vehicles involved, until all of the vehicles involved have an identical control card or until a predefined number of repetitions has been reached.

In this way, in a direct exchange between the vehicles the control cards can be improved iteratively, so that all vehicles have the same control card. Plausibility information can include for example accompanying information, for example about reliabilities. For example, it can relate to the information or data already described above. Information about reliabilities, for example from environmental sensors, can be used, for example, to give priority to specific control cards or to attribute greater importance to them, if they have been generated using particularly reliable sensors.

According to one embodiment it is provided that a comparison of control cards and/or plausibility information includes a respective plausibility check, wherein a plausibility check preferably comprises one or more of the following steps evaluating and/or weighting available information, in particular in relation to information from other vehicles, determining the significance and/or reliability of information, checking which other vehicles have identical information or have sent identical information, adding information, if this is complementary.

As part of a respective plausibility check, respective control cards can be evaluated and/or modified, so that a control card is formed that can use all of the vehicles involved or that applies to all vehicles. If identical information is available from a plurality of vehicles, this information typically has a greater degree of reliability, so that it can be taken into particular consideration when creating a common control card. The same can apply to more significant and/or more reliable information.

Complementary information is defined in particular as information which can be taken over without any changes into a single control card, without thereby increasing the risk of collision of vehicles complying with said control card. For example, this can consist of complementary information in the case of a right-of-way for a road and give way for a crossing road and complementary traffic regulations.

According to one embodiment, it is provided that when performing the matching procedure one or more of the following steps are performed iteratively:

evaluating the significance and/or confidence level of information with thresholds or probabilities, for example for dangerous situations or the driving mode such as selfdriving or automatically driving a respective vehicle, plausibility checks, for example technical or statistical checks, bringing together information, in particular all available information, merging, in particular creating a new, for example extended, in particular spatially extended and/or refined image, which in particular has a consistent content.

An image can be defined for example as a control card. This can also include a differently represented assessment of a traffic situation or a road topology. An image has consistent content in particular when the respective traffic regulations correspond with one another, so that the probability of collision when observing the traffic regulations or a control card created from the latter cannot be increased and/or is minimal.

Of course, the matching procedure can be performed both in the vehicle that has triggered the matching procedure, in particular as explained above, or also in every other vehicle involved. The method is thus, particularly in this case, not restricted to being performed in one vehicle. It can for example also be a method which is performed distributed over several vehicles.

According to one embodiment, it is provided that a control card is formed from the matching procedure, which is sent to a number of other vehicles.

This enables in particular the creation of a control card to be observed by all of the vehicles.

According to one embodiment, the method for performing the matching procedures also comprises a step of identifying a blockage.

A blockage is defined in particular as a situation in which a plurality of vehicles are moving towards one another or are arranged such that it is not possible to define a clear right-of-way rule. This may be the case for example when four vehicles from different directions are approaching an intersection where the right-before-left rule applies and reach the intersection at the same time.

According to one embodiment, it is provided that in the case of a blockage a control card is created and/or determined
that enables the best possible flow of traffic,
in which vehicles which cannot participate in the process, in particular vehicles without car-to-X-communication technology, are let through with priority, and/or
in which, particularly in the case of an impasse, priorities are allocated to vehicles on the basis of one or more of the following parameters:
driving speed,
fixed set of rules,
driving direction, for example compass direction,
reading of a respective right-of-way counter,
navigation information,
information about activated components such as a navigation system,
information about indicators,
information about automatic steering,
information about giving way,
destination,
planned trajectory,
special action rights or provision of special right-of-way features; or
wherein in the case of a blockage the matching procedure is interrupted.

An impasse is defined in particular as a situation in which none of the vehicles has right-of-way a priori. The term giving way is defined in particular to mean that a vehicle foregoes its possible right-of-way on its own accord, the giving way being preferably communicated to the other vehicles involved.

According to one embodiment, it is provided that in the case of a blockage or impasse the method performs a step of identifying whether giving way is appropriate, and in the case of giving way a message is sent about giving way to the other vehicles involved.

In this way the complexity of the rules can be reduced considerably, as a vehicle which gives way leads to giving priority at least at a clear and directly registerable traffic regulation.

According to one embodiment, it is provided that when performing the matching procedure the following steps are carried out:
establishing a vehicle involved in the matching procedure or a road side unit as a master unit,
determining a control card for all of the vehicles involved in the matching procedure by means of the master unit, and
sending the control card to all of the vehicles involved.

In contrast to the approaches described above, which can also be referred to as cooperative approaches at least in some embodiments, with this approach a master unit is specified which takes over the formation of a control card valid for all vehicles. In this way, it is possible to avoid a plurality of iterations between the vehicles. Rather it is possible to concentrate on the process of creating a control card on a vehicle, which then sends the control card to the other vehicles.

According to one embodiment, it is provided that the method also comprises a step of sending a confirmation to the master unit and/or to other vehicles involved in the matching procedure after receiving a control card from the master unit.

In this way it is possible, in particular, to check and/or verify, that all of the vehicles involved have received the control card. A critical situation which may result from this, such as for example a vehicle not receiving the control card correctly, can be prevented in this way.

According to one embodiment, it is provided that the master unit is determined from the vehicles involved in the matching procedure, preferably by using one or more of the following criteria:
times of arrival at a location with a traffic situation to be regulated,
quality of respective sensors,
reliability of driving experience,
number of regulations as master unit in the past,
special action rights or provision of special right-of-way features and/or
wherein a unit arranged at the road-side, in particular a Road Side Unit (RSU) is determined as the master unit.

By means of said criteria, it is possible to make a suitable selection of the master unit that is appropriate for the situation. Suitable indicators can be provided for criteria such as quality or driving experience. Counters can be provided for criteria such as the number of requirements as master unit in the past. Special action rights can in fact include particular rights that are taken advantage of, for example speeding when an ambulance or fire engine is responding to an emergency. Right-of-way features can be provided independently of their actual utilisation, for example when an ambulance is not responding to an emergency and is adhering to the traffic regulations.

A road side unit can be in particular an electronic device which is arranged near a road and is designed to communicate with vehicles. A road side unit of this kind, in particular the relevant functionality, can be provided here as a master unit.

According to one embodiment, it is provided that vehicles that are not the master unit perform one or more of the following steps:
sending traffic regulations and/or at least one control card to the master unit,
receiving a control card from the master unit,
and preferably also sending a confirmation about observing the control card received by the master unit.

In this way, suitable information can be sent to the master unit or received from the latter.

According to one embodiment, it is provided that the master unit performs one or more of the following steps:
receiving traffic regulations and/or control cards from vehicles,
bringing together and/or merging the traffic regulations or control cards,
identifying and/or resolving blockages and/or unclear rule situations, in particular by adapting or modifying a control card,
sending a control card created from the latter, in particular a merged control card, to other vehicles involved in the matching procedure,
sending the driving behaviour of the vehicle, which is the master unit.

In this way, the master unit performs steps which are used for creating the joint control card and/or for improving the processing of a control card in a vehicle.

According to one embodiment, it is provided that when performing the matching procedure there is a random allocation of priorities to the vehicles involved, wherein a vehicle with a higher priority has right-of-way over vehicles with a lower priority.

In the absence of other indicators for priorities, this allows a pragmatic, simple and fair allocation of priorities to the individual vehicles. Rights-of-way or priorities should preferably correspond with one another, which can mean in particular, that the respective rights-of-way or priorities or traffic regulations derived from the latter result in the lowest possible risk of accident.

According to one embodiment, it is provided that if a termination criterion is met during the matching procedure, the method comprises a step of terminating the matching procedure.

This makes it possible to react to a particularly difficult situation, where for example it is possible to avoid a matching procedure that is too long and possibly inconclusive. In particular, for example it is possible to avoid the matching procedure taking up too much time, in order to ensure the safe control of the traffic situation before the arrival of the vehicles at the critical location. When terminating the matching procedure for example driving manoeuvres can be stopped, and this can be transmitted to the respective driver, or other suitable measures can be taken for avoiding a collision in particular.

According to one embodiment, it is provided that the control card or the additional control card is received via a radio connection, in particular in a car-to-X-message. In principle, confirmations can also be sent or transmitted via a radio connection, in particular in a car-to-X-message.

This enables in particular the direct exchange of control cards or confirmations between the vehicles involved without the interconnection of a mobile network.

According to one embodiment, it is provided that the method also comprises a step of sending information, in particular about control cards and/or traffic regulations, to following or other road users, wherein said sending step is repeated continually or performed in response to a situation that has been controlled in the past.

In this way, other, in particular following, road users can receive information about the controlled situation. This enables the latter to take over the respective control card in comparable situations for example.

According to one embodiment, it is provided that the control card and/or the additional control card are assigned to
an intersection,
a roundabout
a junction, in particular joining a motorway,
a narrow section,
a stopping point and/or
a road, in particular a road where overtaking is possible.

In such locations there are often situations where rules need to be applied, which can be controlled advantageously by means of the method according to the invention.

Of course, an aspect of the invention also relates to a device for performing the method according to the invention. For example, such a device can be an electronic control device, which comprises processor means and storage means, a program code being stored in the storage means, whereby the method according to the invention is performed in this embodiment. A control device of this kind can also be integrated into another device for example, such as in a control device for automatic driving or driver assist systems. The invention also relates to a non-volatile computer-readable storage medium, which contains program code, in which embodiment a method according to the invention is performed by a processor. Of course, in principle it is possible to access all of the described embodiments and variants of the method according to the invention.

Furthermore, an aspect of the invention relates to a system consisting of a number of vehicles, wherein each vehicle is designed to perform a method according to the invention, and wherein the vehicles are designed to communicate with one another, in particular for performing the method according to the invention and in particular by using car-to-X-communication. With regard to the method according to the invention it is possible to access all of the described embodiments and variants.

BRIEF DESCRIPTION OF THE DRAWINGS

A person skilled in the art can take further features and advantages of the invention from the example embodiments described in the following with reference to the accompanying drawing. In the latter.

DETAILED DESCRIPTION OF THE PREFERRED EMBODIMENTS

Figure 1:
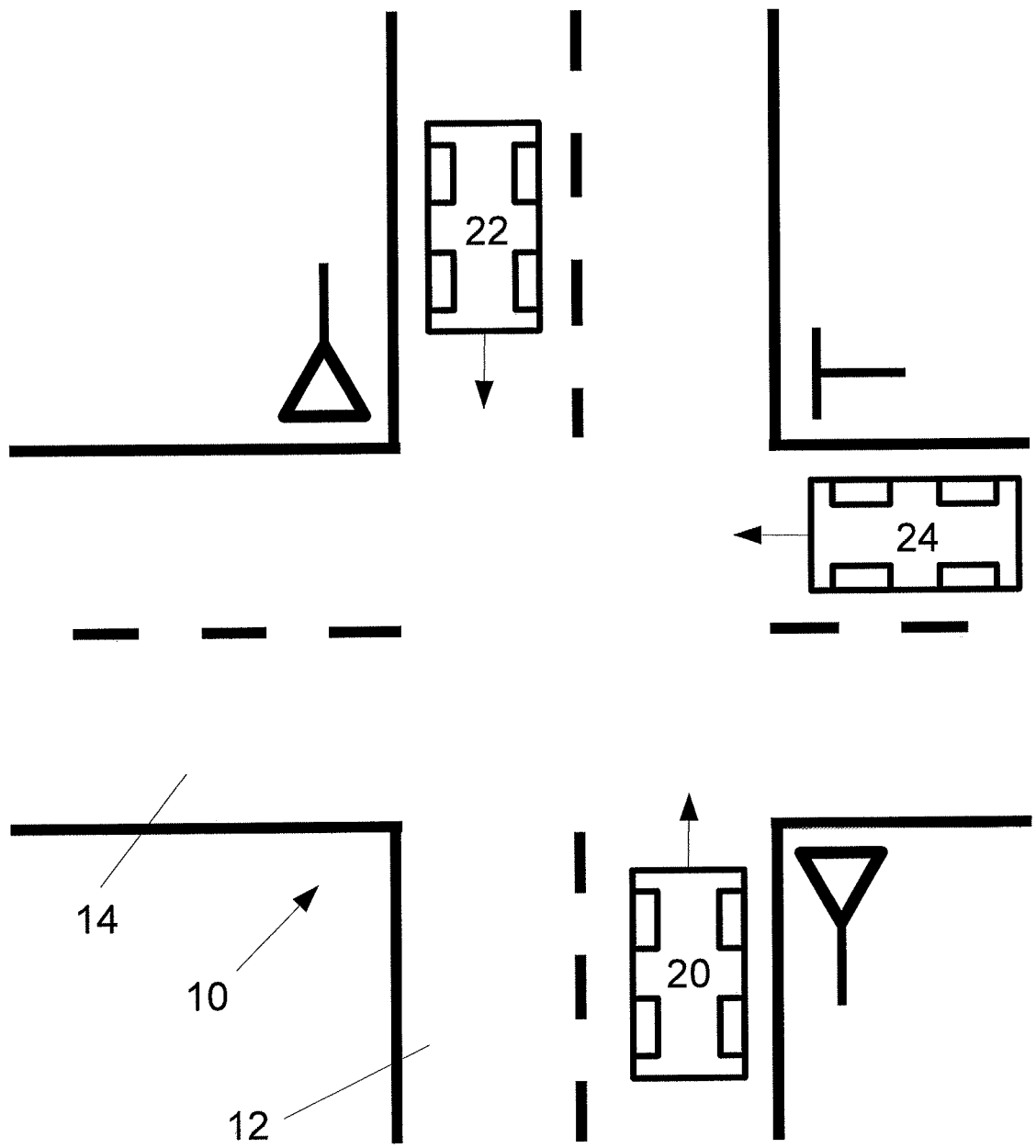
FIG. 1: shows a situation to be regulated at an intersection.

FIG. 1 shows an intersection 10 at which a first road 12 and a second road 14 cross at right angles. On the first road 12 a first vehicle 20 is driving towards the intersection 10. A second vehicle 22 is moving in the opposite direction on the other side of the intersection 10, wherein the latter is also driving towards the intersection 10. On the second road 14 a third vehicle 24 is driving transversely to the latter, which is also approaching the intersection 10. The vehicles 20, 22, 24 are only shown schematically. Respective arrows indicate the driving directions.

In the situation shown in FIG. 1, the unregulated continuation of all of the vehicles 20, 22, 24 would lead to a collision. For this reason there are right-of-way rules that determine the priority of the vehicles 20, 22, 24. The latter are indicated here by means of road signs, where the first vehicle 20 and the second vehicle 22 each have a sign in front of them which indicates to give way, whereas the third vehicle 24 has a right-of-way sign in front of it. From this rule it follows that the first vehicle 20 and the second vehicle 22 have to wait for the third vehicle 24 to pass first. Then the first vehicle 20 and the second vehicle 22 can drive on straight away as their paths do not cross.

It is assumed in this case that the first vehicle 20 identifies the traffic situation to be regulated first, as it determines by means of satellite navigation and electronic road card that it is driving towards an intersection and also identifies by means of a camera that other vehicles are also approaching the intersection. By means of the camera the first vehicle 20 also identifies the give way sign, which tells the first vehicle 20 that it does not have right-of-way.

From this the first vehicle then derives a control card which is associated with the intersection 10. The control card includes the traffic rule "give way" for the first vehicle 20. As in such a case in the absence of any indication of a differing right-of-way rule the opposite driving direction is also subject to the same traffic rule, the give way traffic rule is also included for the second vehicle. It is also known that at such intersections crossing traffic has right-of-way, when a specific vehicle has to give way. Therefore, the traffic rule "right-of-way" is also entered for the third vehicle 24 and for the opposite direction.

The generated control card, which contains the previously mentioned traffic regulations in a specific generally known format, is then transmitted from the first vehicle 20 by car-to-X-communication means and received by the other vehicles 22, 24. The latter also create their own control card by means of respective cameras in the same way as previously described. Said self-created control cards are compared with the control card received from the first vehicle 20. If the control cards match, the respective vehicles 22, 24 send a confirmation to the first vehicle 20 that the control cards match and thus for all vehicles 20, 22, 24 it is possible to pass the intersection 10 without any risk by using identical control cards. The traffic rules contained in the common control card are displayed for the attention of the respective drivers of the vehicles 20, 22, 24.

If the control cards do not match with one of the other vehicles 22, 24, for example because one of the vehicles 20, 22, 24 has not correctly identified a road sign as it is covered with snow, a matching procedure is initiated. For the latter there are in principle two possible embodiments, which are both described in the following with reference to FIG. 1.

According to a first embodiment, the vehicles 20, 22, 24 carry out a cooperative matching procedure. In this case the control cards are exchanged with one another in a plurality of iterative steps and evaluated in the vehicles 20, 22, 24 respectively. In particular, information is evaluated which relates to the reliability of the respective camera, by means of which the control card has been created. Furthermore, a traffic regulation is considered more reliable if a greater numbers of vehicles have identified the latter independently of one another.

If the vehicles 20, 22, 24 hereby within a specified highest number of iterative steps arrive at a common control card, said control card is distributed to the vehicles and observed. In this way it is possible to pass the intersection 10 without risk, wherein the traffic regulations contained in the common control card are displayed to the respective drivers. If the vehicles 20, 22, 24 do not arrive at a common control card within a specific highest number of iterative steps, the matching procedure is terminated. In this case a signal is given to the respective drivers of the vehicles 20, 22, 24, which asks them to make their own assessment of the traffic situation.

According to a second embodiment, a vehicle is specified as the master unit of vehicles 20, 22, 24, to which all of the information about the control cards and their creation is sent as previously mentioned. The master unit can be defined as the vehicle which has been the master unit the least often according to an internal counter. The vehicle determined as the master unit then evaluates the available information and creates a common control card for the attention of all vehicles. Said common control card is sent to the other vehicles, which send out a confirmation of receipt and possibly also an acceptance receipt. The traffic regulations contained in the common control card are selected so that they are complementary to one another, i.e. so that in particular it is possible for all vehicles 20, 22, 24 to pass the intersection 10 without colliding. These rules are displayed to the respective drivers of the vehicles 20, 22, 24.

Figure 2:
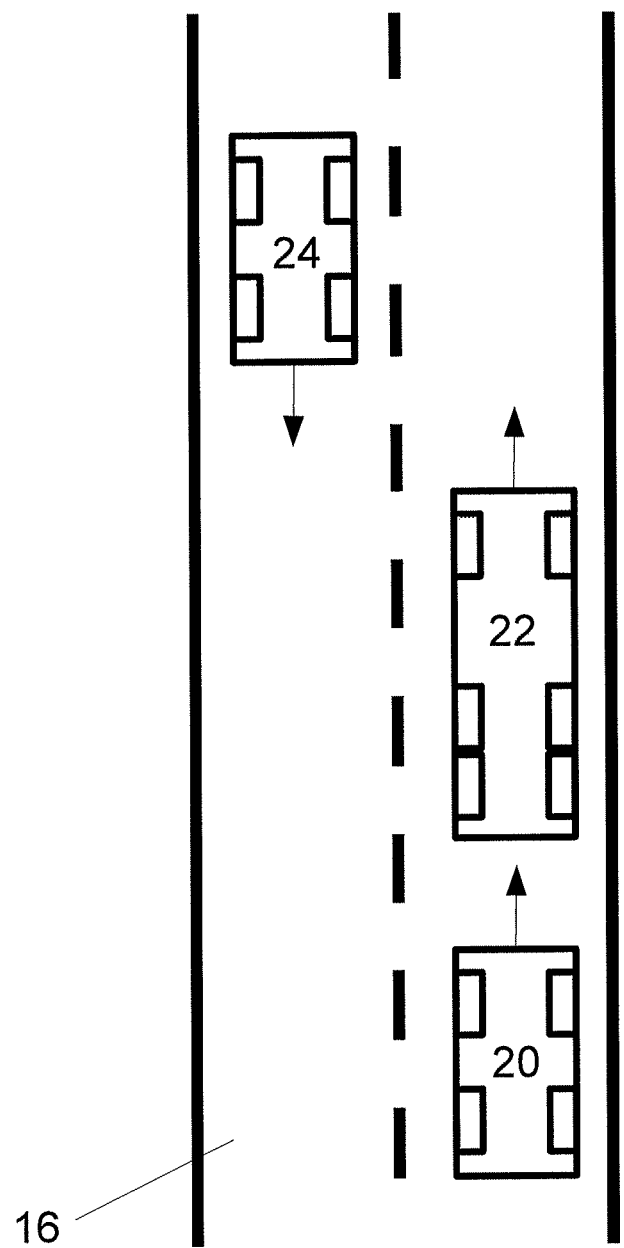
FIG. 2: shows a situation to be regulated on a road.

FIG. 2 shows a single-lane road 16, on which vehicles are driving in both directions. This consists of a first vehicle 20 which is following a second vehicle 22, and a third vehicle 24 travelling in the opposite direction. The second vehicle 22 is here a slow-moving lorry. Therefore, the first vehicle 20 has a reason for overtaking the second vehicle 22.

The second vehicle 22, being a commercial vehicle, is equipped with better sensors, in particular a better camera than the other vehicles 20, 24. Furthermore, it has a better field of vision over the road 16 than the following first vehicle 20. Therefore, the second vehicle 22 sends information to the first vehicle 20, in which it shows that can be of assistance in performing an overtaking procedure.

If the driver of the first vehicle 20 would like to perform an overtaking procedure, he activates a button provided in the first vehicle 20. With this the intention to overtake is sent in a message to the second vehicle 22. The latter then detects with its camera the environmental situation in front of him and identifies the oncoming third vehicle 24, which will clearly stand in the way of the overtaking procedure of the first vehicle 20. The second vehicle 22 then creates a control card, which contains a temporary no overtaking rule for the road 16. Said control card is sent by the second vehicle 22 to the first vehicle 20, which receives said control card and determines that, due to the temporary no overtaking rule, it is currently not possible to undertake an overtaking procedure. This is displayed to the driver of the first vehicle 20, so the latter is requested not to perform the planned overtaking procedure. A collision with the third vehicle 24 is effectively avoided in this way.

Of course, the example embodiments shown here are only given in schematic form. For simplification, reference numerals are not inserted in the following claims. It is assumed that it would be straightforward to attribute the terms of the claims to the example embodiments.

In general, it should be noted that car-to-X-communication is defined in particular as direct communication between vehicles and/or between vehicles and infrastructure devices. For example it can consist of car-to-car communication or car-to-infrastructure communication. Where reference is made in this application to communication between vehicles this can be performed in principle for example as part of a car-to-car-communication, which is typically performed without communication through a mobile network or similar external infrastructure and which therefore should be differentiated from other solutions, which are based on a mobile network for example. For example, car-to-X-communication can be performed by using the standard IEEE 802.11p or IEEE1609.4. A car-to-X-communication can also be referred to as C2X-communication. The sub-areas can be denoted as C2C (car-to-car) or C2I (car-to-infrastructure).

It should also be noted that embodiments of the method are possible in at least one of its variants for example in which only one vehicle identifies the traffic regulations, creates a control card from the latter and then sends it for the immediate attention of other vehicles. Said vehicles then receive the control card and use it without additional checking. Preferably, they can confirm the receipt and/or acknowledgment. It is also possible for all of the vehicles involved to receive respective control cards from a central server.

Of course, a method according to the invention can also be performed for example by vehicles or with the involvement of vehicles, which do not have environmental sensors such as for example cameras, RADAR or LIDAR. For example, such vehicles can approach an intersection or another location to which rules need to be applied, which is also being approached by other vehicles, which have environmental sensors. Vehicles without environmental sensors typically cannot produce a control card, but can still participate in a matching procedure or matching step and contribute to providing a generally accepted and/or used control card.

It should be noted that a method according to the invention can be used in principle for all kinds of vehicles. In particular, it can be used for freely steerable or also automatically driving vehicles such as for example cars, lorries, buses or emergency vehicles. However, it can also be used for railed vehicles, for example for example trams or even normal trains. It can also be used in vehicles, which are operated by human or animal muscle power or in special vehicles such as for example in vehicles used for transport within plants, for example forklift trucks.

The claims belonging to the application are not a hindrance to the attainment of further protection.

Should it become clear that during the method one feature or a group of features is not absolutely necessary, the applicant has already attempted to formulate at least one independent claim, which no longer comprises the feature or the group of features. This can consist for example of a subcombination of a claim made on the day of application or a subcombination of a claim made on the day of application which is restricted by additional features. Such claims or combinations of features to be newly formulated are considered to be covered by the disclosure of this application.

It should also be noted that embodiments, features and variants of the invention, which are described in the various different embodiments or example embodiments and/or are shown in the Figures, can be combined with one another as desired. Individual or a plurality of features can be exchanged as desired. Combinations of features from the latter are considered to be covered by the disclosure of this application.

Back referrals in dependent claims to previous claims should not be considered to mean that independent, protection of the features of the dependent claims is being forfeited. Said features can also be combined as desired with other features.

Features which are only disclosed in the description or features which are disclosed in the description or in a claim only in connection with other features, can be considered to be significant independently as essential to the invention. They can therefore also be included in the claims individually for delimiting from the prior art.

What is claimed:

1. A method for handling at least one control card containing traffic regulations in a plurality of vehicles, wherein the control card comprises a set of traffic regulations for controlling traffic flow of the plurality of vehicles, wherein each of the vehicles includes storage memory, and a processor accessible to the storage memory and configured to:
   obtain, by a first vehicle of the plurality of vehicles, a first control card of the at least one control card, wherein the first control card is at least one of stored in the storage memory of the first vehicle or received from an alternate source, and wherein the first control card includes traffic regulations specific to traffic compliance for the first vehicle;
   receive, by the first vehicle via car-to-X communication, a second control card directly from a second vehicle of the plurality of vehicles, wherein the second control card includes traffic regulations specific to traffic compliance for the second vehicle;
   compare the received second control card with the first control card to determine a match between the first and second control cards; and
   when the comparison indicates that the first control card matches the second control card, the first vehicle transmits a confirmation to the second vehicle,
   when the comparison indicates that the first control card does not match the second control card, a matching procedure is performed to create a common control card, the common control card is created by a cooperative matching procedure where the first vehicle and the second vehicle iteratively cooperate with each other to evaluate information based on which the first control card and the second control card were generated,
   wherein:
   a) when the common control card is created within a predetermined number of iterations, the first vehicle and the second vehicle are controlled using the common control card,
      wherein the traffic regulations applicable to the traffic compliance for the first and second vehicles are synchronized based upon the common control card,
      wherein the processor of the first vehicle or another processor of the first vehicle is configured to control at least one vehicle system of the first vehicle based upon the common control card, and
      wherein the processor of the second vehicle or another processor of the second vehicle is configured to control at least one vehicle system of the second vehicle based upon the common control card, and
   b) when the common control card is not created within the predetermined number of iterations, the cooperative matching procedure is terminated, the first vehicle requests that a driver of the first vehicle make their own assessment of the traffic, and the second vehicle requests that a driver of the second vehicle make their own assessment of the traffic.

2. The method according to claim 1, further comprising: recognizing an approach by at least one of the vehicles to an intersection or junction, wherein the approach is recognised by environmental sensors, including at least one of a camera, satellite navigation, an electronic road map and/or the car-to-X-communication.

3. The method according to claim 2, wherein the traffic regulations contained in the control card are assigned to the intersection or junction.

4. The method according to claim 1, wherein the comparing is performed such that the first vehicle sends a message to the second vehicle which receives a request for sending the second control card.

5. The method according to claim 1, wherein the comparing is repeated periodically.

6. The method according to claim 1, wherein, together with the control card, accompanying information is received, comprising at least one of:
   a registration number of a vehicle sending the control card;
   an identification number of a vehicle sending the control card;
   an intersection topology;
   object properties of a vehicle sending the control card;
   information about the reliability of the control card and/or about the reliability of environmental sensors;
   information about the vehicles, which are not equipped with car-to-X-communication technology, including their registration number; or
   a measure of reliability of the control card.

7. The method according to claim 1, wherein the first control card is produced by:
   identifying environmental surroundings of the vehicles by a number of environmental sensors, deriving a number of traffic regulations based on the environmental surroundings, and
producing the first control card on the basis at least of the traffic regulations.

8. The method according to claim 1,
wherein the first control card is received from a central server.

9. The method according to claim 1,
wherein the first and second vehicles which are involved in the synchronizing procedure are approaching an intersection or junction or are driving on the same road; and/or
wherein the first and second vehicles are exclusively involved in the synchronizing procedure from which an intersection of trajectories has been calculated.

10. The method according to claim 1,
wherein the synchronizing procedure is performed by multiple direct exchanges, via the car-to-X communication, and comparison of control cards and/or plausibility information between involved vehicles, until all of the vehicles involved have an identical control card or until a predefined number of comparisons has been reached, the plausibility information indicating reliability of a sensor used in the creation of the control card.

11. The method according to claim 6,
wherein the comparing of the control cards and/or the accompanying information contains a respective plausibility check,
wherein the plausibility check comprises a review of data from one or more of the following:
evaluating and/or weighting available accompanying information transmitted from one of the plurality of vehicles with reference to the accompanying information from other vehicles of the plurality of vehicles;
determining a significance and/or reliability of the evaluated information, checking which of the other vehicles have a same control card or accompanying information or have sent the same accompanying information, and adding new information, when the new information is complementary to the plausibility check.

12. The method according to claim 1,
wherein when performing the matching procedure one or more of the following are performed repeatedly:
evaluating a significance and/or a confidence level of information from the control cards with thresholds or probabilities,
checking plausibility of the information indicating reliability of a sensor used in the creation of the control card,
bringing together all information,
creating a new control card.

13. The method according to claim 1,
wherein from the synchronizing procedure a new control card is produced which is sent to a number of the vehicles involved in the synchronizing procedure.

14. The method according to claim 1,
which when performing the synchronizing procedure, further comprises identifying a blockage in an interpretation of the traffic regulations.

15. The method according to claim 14,
wherein, in an event of the identified blockage, an updated control card is created to coordinate a flow of the vehicles
in which vehicles without car-to-X-communication technology are let through with priority, and/or
in which, priorities are allocated to the vehicles involved in the blockage on the basis of one or more of the following parameters:
driving speed,
a fixed set of rules,
driving direction of the vehicles involved in the blockage,
a reading of respective right-of-way counter,
navigation information,
information about activated components,
information about indicators,
information about automatic steering,
information about giving way,
a destination,
a planned trajectory, and
special action rights or provision of special right-of-way rights; or
wherein in the case of continued blockage, the synchronizing procedure is interrupted.

16. The method according to claim 1,
wherein when performing the synchronizing procedure the following are carried out:
establishing the vehicles involved in the synchronizing procedure or a road side unit as a master unit,
determining a common control card for each of the vehicles involved in the synchronizing procedure by the master unit, and
sending the common control card to each of the vehicles involved.

17. The method according to claim 16, further comprising:
sending a confirmation to the master unit and/or to the vehicles involved in the synchronizing procedure after receiving the common control card from the master unit.

18. The method according to claim 16,
wherein the master unit is determined from the vehicles involved in the synchronizing procedure, and by using one or more of the following criteria:
times of arrival at a location with a traffic situation to be regulated by the traffic regulations,
a quality level of sensors,
driving experience of a respective driver of the vehicles involved,
a number of past assignments as master unit,
special action rights or provision of special right-of-way rights and/or
wherein the roadside unit arranged at the road-side is determined as the master unit.

19. The method according to claim 16,
Wherein the vehicles, which are not the master unit, perform one or more of the following:
sending traffic regulations and/or at least one control card to the master unit, receiving a control card from the master unit,
and sending a confirmation about observing the control card received by the master unit.

20. The method according to claim 16,
wherein the master unit performs one or more of the following:
receiving traffic regulations and/or control cards of vehicles,
merging the traffic regulations or control cards,
identifying and/or resolving blockages and/or unclear rule situations by modifying a control card,
sending a common control card created from the modifying via a merged control card, to the vehicles involved in the synchronizing procedure, and sending a road behaviour of the vehicle which is the master unit.

21. The method according to claim 1,
wherein when performing the synchronizing procedure, further comprises allocating priorities to the vehicles involved,
wherein a vehicle of the vehicles involved with a higher priority has right-of-way over the vehicles with a lower priority.

22. The method according to claim 1,
wherein when a termination criterion is met, the synchronizing procedure further comprises terminating the matching procedure.

23. The method according to claim 1,
further comprising sending information via control cards to following or other vehicles,
wherein the sending is repeated continually in response to a situation that has been regulated in the past.

24. The method according to claim 1,
wherein the first control card and/or the second control card is assigned to:
an intersection,
a roundabout,
a junction, in particular on a motorway,
a narrow section,
a stopping point, and/or
a road when overtaking.

* * * * *